US 12,539,971 B2

United States Patent
Trillaud

(10) Patent No.: US 12,539,971 B2
(45) Date of Patent: Feb. 3, 2026

(54) SEAT UNIT WITH MEANS FOR DETECTING PRESSENCE OF PASSENGER ON SEAT OF AN AIRCRAFT

(71) Applicant: AIRBUS ATLANTIC SAS, Rochefort (FR)

(72) Inventor: Benoît Trillaud, Rochefort (FR)

(73) Assignee: AIRBUS ATLANTIC SAS, Rochefort (FR)

( * ) Notice: Subject to any disclaimer, the term of this patent is extended or adjusted under 35 U.S.C. 154(b) by 0 days.

(21) Appl. No.: 18/868,240

(22) PCT Filed: May 23, 2023

(86) PCT No.: PCT/FR2023/050728
§ 371 (c)(1),
(2) Date: Nov. 22, 2024

(87) PCT Pub. No.: WO2023/227847
PCT Pub. Date: Nov. 30, 2023

(65) Prior Publication Data
US 2025/0326488 A1    Oct. 23, 2025

(30) Foreign Application Priority Data
May 24, 2022 (FR) ..................................... 2204972

(51) Int. Cl.
*B64D 11/06* (2006.01)
(52) U.S. Cl.
CPC ........ *B64D 11/064* (2014.12); *B64D 11/0601* (2014.12); *B64D 11/06395* (2014.12); *B64D 11/0641* (2014.12); *B64D 11/0644* (2014.12)
(58) Field of Classification Search
CPC .............. B64D 11/0606; B64D 11/064; B64D 11/0601; B64D 11/0602; B64D 11/0604; B60N 2/002; B60N 2002/0212
See application file for complete search history.

(56) References Cited

U.S. PATENT DOCUMENTS

| 11,780,585 B2 * | 10/2023 | Rousse .............. B64D 11/0606 244/118.6 |
| 2002/0043851 A1 | 4/2002 | Romca et al. |
| 2023/0002056 A1 * | 1/2023 | Rousse .............. B64D 11/0641 |

FOREIGN PATENT DOCUMENTS

| DE | 102018120995 | 3/2020 | |
| WO | WO-2020043776 A1 * | 3/2020 | ........... B64D 11/064 |
| WO | 2021122207 | 6/2021 | |

OTHER PUBLICATIONS

Upright Position of Seat Backs for Takeoff and Landing, 209. Air Carrier Operations Bulleting No. 1-94-8, Federal Aviation Administration. https://www.faa.gov/sites/faa.gov/files/about/initiatives/cabin_safety/regs/acob209.pdf.*

(Continued)

*Primary Examiner* — Arfan Y. Sinaki
(74) *Attorney, Agent, or Firm* — Perman & Green, LLP

(57) ABSTRACT

A seat unit for a passenger of an aircraft, including a seat and a shell, the seat including a sitting portion and a backrest movable on a base, respectively actuated by a motor-driven mechanism, the unit including a means for detecting the presence of the passenger on the seat, the seat being configured to adopt a takeoff/taxiing/landing position when a presence of the passenger is detected, in which the sitting portion is away from the shell and in which the backrest is reclined in the direction of the shell, and a docking position when a presence of the passenger is not detected, in which the sitting portion is close to the shell, and in which the backrest is substantially parallel to the shell, so as to widen the egress between two seat units.

13 Claims, 6 Drawing Sheets

(56) References Cited

OTHER PUBLICATIONS

International Search Report for International Application No. PCT/FR2023/050728, dated Aug. 23, 2023.

* cited by examiner

SEAT UNIT WITH MEANS FOR DETECTING PRESSENCE OF PASSENGER ON SEAT OF AN AIRCRAFT

CROSS REFERENCE TO RELATED APPLICATIONS

This application is a National Stage of International Application No. PCT/FR2023/050728, having an International filing date of 23 May 2023, which designated the United States of America, and which International Application was published under PCT Article 21 (2) as WO Publication No. 2023/227847, which claims priority from and the benefit of French Patent Application No. 2204972 filed on 24 May 2022, the disclosures of which are incorporated herein by reference in their entireties.

BACKGROUND

Field

The field of the disclosure is that of seats for passengers of transport vehicles, in particular aircrafts such as airliners.

More specifically, the disclosure relates to a seat unit for an aircraft passenger having an automatic docking position for widening the passage, a seat arrangement comprising such units, as well as an aircraft comprising such an arrangement.

The disclosure finds applications in particular in furnishing of cabins of medium- or long-haul type airliners, in particular business class cabins.

Brief Description of Related Developments

In air transport, the comfort of the passengers is an essential competitive component. For most airlines, this comfort is conditioned by requirements of profitability and reduction of the environmental impact which are reflected in high-density layouts, in other words placing as many passengers as possible in the space available to this end.

The comfort level required in the upper classes (the first class and the business class) must for example offer the passengers the possibility of lying down in a sleeping position, especially when the duration of the flight is long, and of benefiting from some intimacy with respect to the other passengers.

To this end, seats that are convertible into a bed have been known for a long time and exist in many configurations. As a general rule, the known seats could also take on predefined positions, for example by reclining the backrest of the seat to adopt a "relaxation" position.

Furthermore, seat units comprising a shell surrounding the seat and isolating the seat from a neighboring similar seat are also known.

A frequent problem in a context of densification of seats is that of passage from an aircraft corridor to the seat, and vice versa. Indeed, when such a passage, also called "egress" in the field of air transport, is too narrow, a considerable effort should be supplied by the passenger to get in or out of his/her seat.

Hence, it is essential to overcome this access problem, while maintaining, and even increasing, the density of seats in the aircraft cabin.

In addition, an additional constraint is set by the airlines, which also require a high comfort level in the seated position of the passenger, i.e. once he/she has got in his/her seat. Thus, it is not sufficient to provide a seat that widens the passage, but it is also necessary to guarantee a high comfort level under all circumstances when the passenger is seated.

Hence, it is necessary to also solve a problem of comfort in the seated position, while offering a seat capable of widening the passage or egress when so is desired.

These problems should be solved in the particular context of air transport, involving particular safety requirements and lightweight constraints on the equipment of the aircraft.

For these reasons, solving the aforementioned problems should also take account of these requirements and constraints. Also, for these reasons, the transposition of solutions from neighboring fields, such as those from the automotive or railway industries, for example, partially addressing the aforementioned problems, cannot be considered.

SUMMARY

The present disclosure aims to overcome all or some of the aforementioned drawbacks of the prior art.

To this end, the disclosure relates to a seat unit for a passenger of an aircraft, in particular an airliner, comprising a seat with an adjustable position and a shell intended to isolate said seat from a similar neighboring seat unit, said seat including a sitting portion and a backrest movable on a base, said sitting portion and said backrest being respectively actuated by a motor-driven mechanism, said unit comprises a means for detecting a presence of said passenger on the seat, said seat being configured to:

adopt a so-called takeoff/taxiing/landing position when a presence of the passenger is detected by said detection means, in which said sitting portion is away from said shell and in which said backrest is reclined in the direction of said shell, and adopt a so-called docking position when no presence of the passenger is detected by said detection means, in which said sitting portion is brought close to said shell, and in which said backrest is substantially parallel to said shell, so as to widen a passage formed between said seat and the shell of a similar seat unit arranged at the front of said seat, or a wall of the aircraft, when said unit is installed in an aircraft cabin.

Thus, a passenger seat is obtained which adopts a docking position clearing the passage or egress when the passenger gets to or leaves his/her seat, in particular when getting on-board, after landing, or during the flight when the passenger wishes to temporarily leave his/her seat. When the passenger sits on the seat, the seat unit rapidly adopts the takeoff/taxiing/landing position, also abbreviated to "TTL" standing for takeoff/taxiing/landing in English terminology, which is more comfortable. Thus, the passenger is seated in the docking position of the seat only for a brief period of time, and is rapidly in a more comfortable position.

Indeed, in the TTL position, the position of the sitting portion away from the shell and the reclined position of the backrest allow for a better support of the lower limbs of the passenger, as well as a posture of the trunk that is more pleasant and relaxing.

It is pointed out that to the extent that the switch from one position into another is performed fully automatically, and with the lowest possible latency, the comfort of the passenger is particularly important since the latter has no handling to perform, but is nevertheless still in the presence of a seat ideally positioned when he/she gets to his/her seat.

It is also pointed out that the seat could of course take on other positions, the choice of which is left to the passenger, like, for example, a relaxation position that is further reclined than the TTL position, or a bed position. It is then provided that, if the passenger stands up from such a position different from the TTL position, the seat returns to the docking position. The TTL position is the position adopted by default when a passenger sits on the seat, the seat being in the docking position beforehand.

According to a preferred aspect, said backrest comprises an upper portion and a movable lower portion configured to be inclined in the direction of said upper portion in said docking position, so as to form an area for lumbar support of a passenger in said docking position.

In this manner, the backrest of the seat could be "broken down" and the transition between the upper portion of the backrest and the sitting portion is softened. Thus, an area for lumbar support of the back of the passenger is obtained in the docking position.

Such a lumbar support significantly increases the comfort of the passenger when he/she is seated in a seat in the docking position. Hence, these arrangements allow making the seat comfortable under all circumstances, even during the brief time between the moment when the passenger sits in a seat in the docking position, and the transition into the TTL position.

According to a particular aspect, said lower portion is able to be inclined via a roller pivotably fastened to said sitting portion, and a cam secured to said lower portion of the backrest, said cam having a profile so that said lower portion pivots in the direction of the upper portion of the backrest when the sitting portion is moved towards said seat unit shell.

Thanks to these arrangements, an inclination of the lower portion synchronized with the movement of the sitting portion is obtained, the lumbar support being progressive between the docking and TTL positions.

In addition, the inclination of the lower portion could be achieved without an additional actuator or motor-driven mechanism, which considerably contributes to a reduction in the economic cost of the unit, as well as to the reduction of its weight.

According to a particular aspect, said lower portion is secured to said upper portion via a hinge.

Thus, a particularly simple design is achieved, the lower portion being held by the upper portion.

According to a particular aspect, said detection means is a pressure sensor.

More specifically, the detection means is a pressure sensor located on the sitting portion of the seat. According to one variant, it may also consist of a pressure sensor located on the backrest of the seat.

According to a preferred aspect, the motor-driven mechanism of said sitting portion is configured to move said sitting portion in translation relative to said base, and wherein the motor-driven mechanism of said backrest is configured to move said backrest in rotation relative to said sitting portion.

In this manner, the kinematics of the seat are achieved by decomposition into two elementary movements, which has the effect of considerably simplifying the design of the seat as well as enabling the use of simple actuators.

According to a preferred aspect, between said takeoff/taxiing/landing position and docking position, the amplitude of translation of said sitting portion relative to said base is comprised between 60 and 160 mm, preferably 110 mm, and the amplitude of rotation of said backrest relative to said sitting portion is comprised between 8 and 16 degrees, preferably 12 degrees.

Alternatively, the amplitude of translation of said sitting portion relative to said base plate may also be comprised between 80 and 140 mm, preferably 100 and 120 mm, and the amplitude of rotation of said backrest relative to said sitting portion may be comprised between 10 and 14 degrees, preferably 11 to 13 degrees.

According to a preferred aspect, the seat comprises a base and said base further comprising an armrest retractable in the direction of said shell, so as to clear said passage formed between said seat and the shell of a similar seat unit in said docking position.

Thus, the passenger can benefit from the additional comfort allowed by an armrest, without the latter hindering the passage or egress, which would be in contradiction with the objective of the present disclosure.

According to a particular aspect, said armrest is actuated by a motor-driven mechanism Thus, the user does not have to supply an additional effort. In particular, the motor-driven mechanism may be synchronized with the movement of the seat in order to further increase the comfort of the passenger.

Another object of the disclosure is a seat arrangement for an aircraft cabin, including at least two seat units according to the disclosure, arranged in front of one another in an alignment direction.

According to a preferred aspect, the seat units are oriented in the alignment direction, corresponding to the direction of a longitudinal axis of the aircraft when the set is installed in said aircraft cabin.

According to a preferred aspect, the seat units are oriented obliquely with respect to the alignment direction, corresponding to the direction of a longitudinal axis of the aircraft when the set is installed in said aircraft cabin.

Thus, such an oblique or "chevron"-like arrangement allows taking advantage of the width of the cabin and thus increasing the density of seats.

Another object of the disclosure is an aircraft of the airliner type, comprising a cabin including at least one seat arrangement according to the disclosure.

BRIEF DESCRIPTION OF THE DRAWINGS

Other advantages, aims and particular features of the present disclosure will appear from the following non-limiting description of at least one particular aspect of the devices and methods that are objects of the present disclosure, with reference to the appended drawings, wherein.

DETAILED DESCRIPTION

This description is given on a non-limitative basis, each feature of an aspect could advantageously be combined with any other feature of any other aspect.

It should be noted, as of now, that the figures are not plotted to scale.

Figure 1:
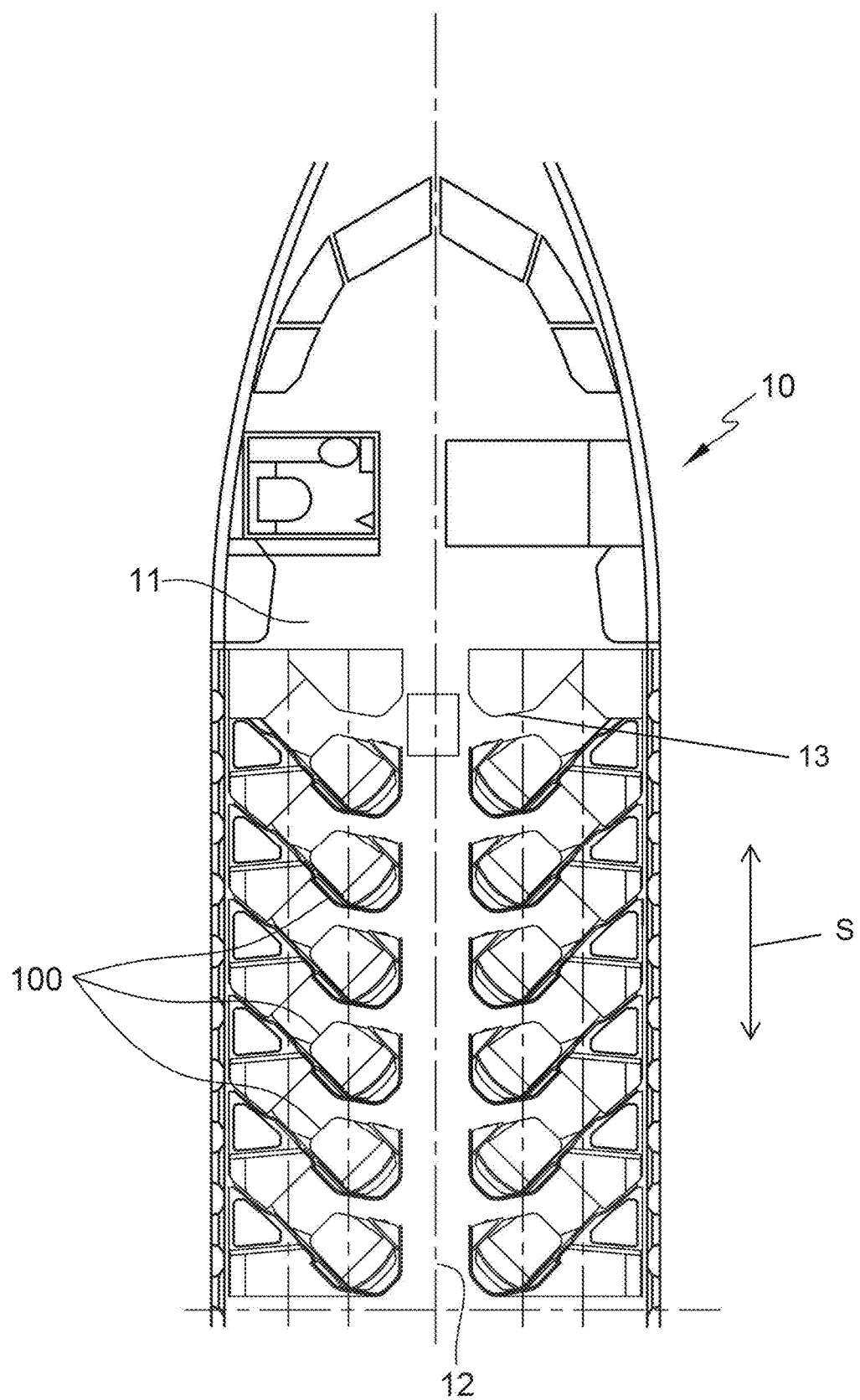
FIG. 1 shows a partial schematic view of an aircraft cabin in top view.
Figure 2:
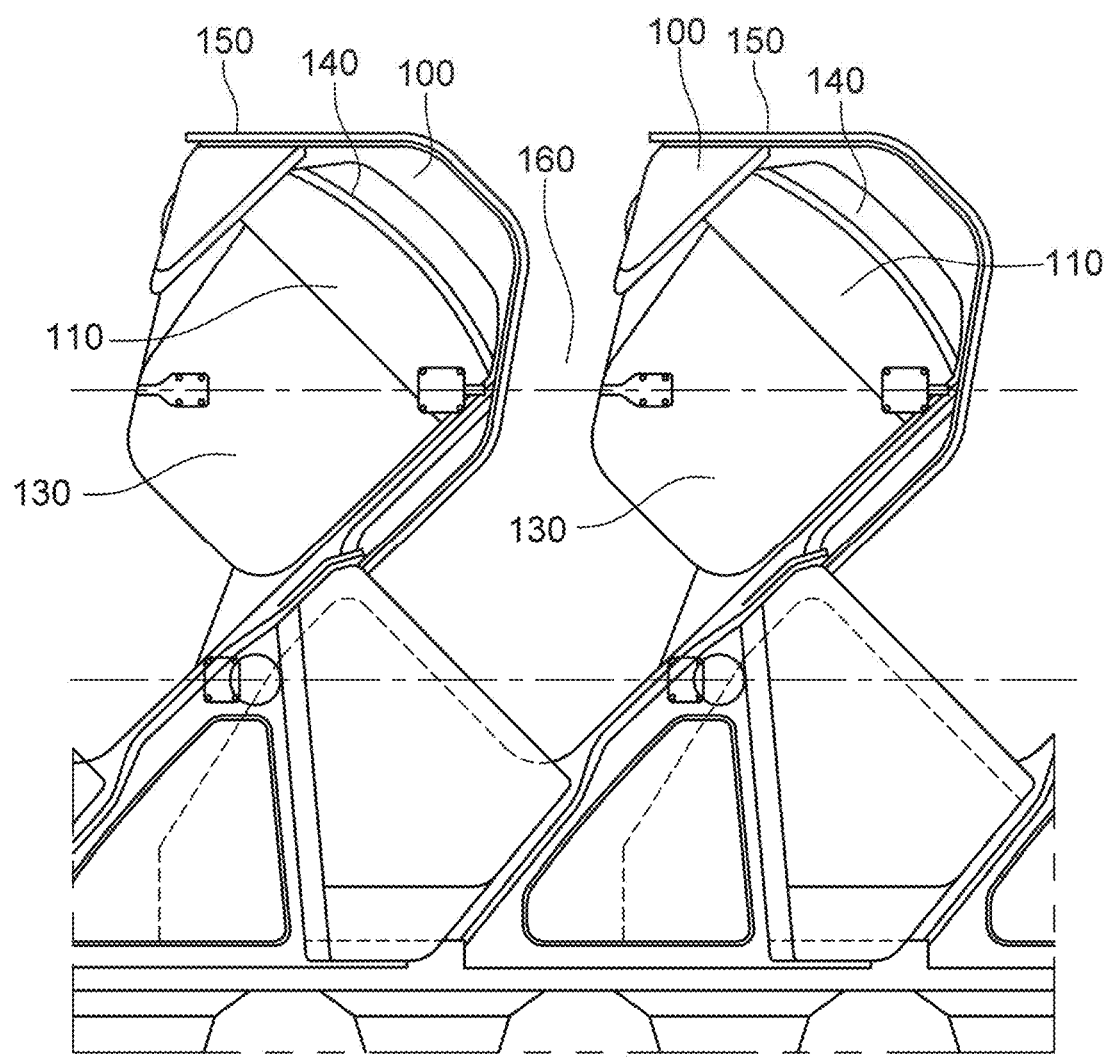
FIG. 2 shows a schematic detail view of an aircraft cabin in top view.

FIG. 1 partially shows a cabin 11 of an aircraft 10 of the a single-aisle-line aircraft type, in top view. FIG. 2 shows a detail view of such a cabin.

Several seat units 100 according to the disclosure are installed on either side of the aisle 12 of the cabin 11. In this case, the aisle is central and follows the longitudinal axis of the aircraft 10. The seat units 100 are aligned behind one another according to an alignment direction (denoted S in FIG. 1) corresponding to the direction of the longitudinal axis, i.e. the alignment direction is parallel to the latter. Moreover, the seat units are oriented obliquely with respect to the alignment direction, in this case towards the outside of the cabin. Such a chevron-like arrangement of the cabin 11 allows tacking advantage of the width of the cabin in particular when the seat units 100 are convertible into beds as is the case of the present aspect. Nonetheless, any other orientation, such as an orientation in the alignment direction, may be considered.

Figure 3:
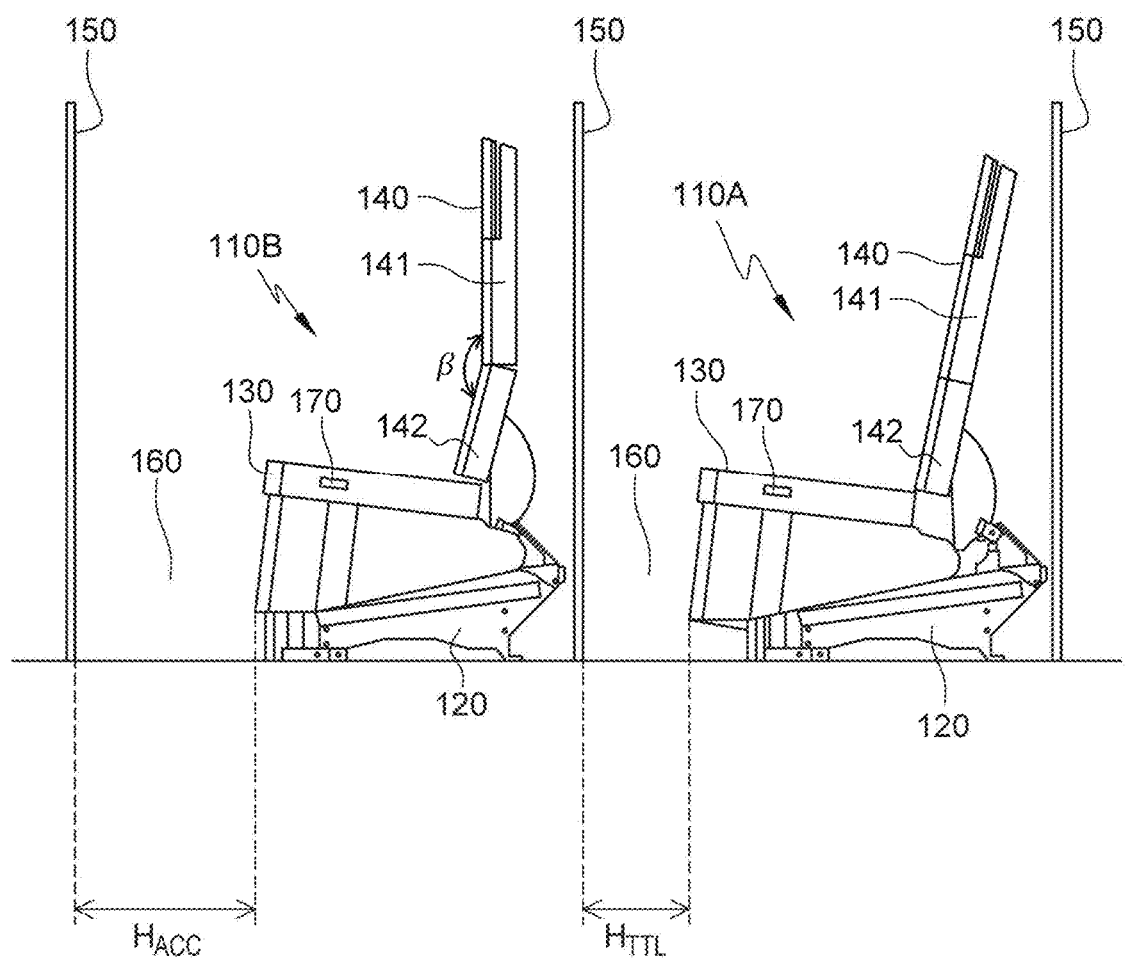
FIG. 3 shows two seat units in top view respectively in a docking position and a TTL position.

As shown in FIG. 3, a seat unit 100 comprises a seat 110 including in particular a base 120 on which a sitting portion 130 and a backrest 140 are movably arranged. More specifically, the sitting portion 130 is slidably arranged on the base 120, and the backrest 140 is pivotably arranged on the sitting portion 130.

Advantageously, the seat unit 100 comprises a shell 150 intended to isolate the seat 110 from a similar neighboring seat unit, in particular located behind the seat 110. The shell 150 may also make up a larger environment by substantially surrounding a rear face of the seat, and extending laterally to the seat to form a semi-closed space dedicated to the passenger of the seat 110. It should be understood that it is the shell 150 of a neighboring seat arranged in front of the seat 110 which isolates the passenger from this neighboring seat. FIG. 2 illustrates such a situation. In the case where the seat 110 is the first one of a row, it may face a wall 13 of the aircraft 10, which then closes the semi-closed space dedicated to the passenger.

The base 120 is fastened to the floor of the cabin. In general, the bases 120 of the different seat units 100 are spaced apart by a fixed predetermined distance.

The seats 110 are in an adjustable position, the sitting portions 130 and the backrests 140 of the seats being movable relative to the base 120.

A seat 110 can take on a plurality of predetermined positions, such as in particular a bed position or a relaxation position.

During takeoff, taxiing or takeoff phases, a passenger cannot be in a bed position or a relaxation position, in particular because of safety regulations in force in the field of air transport.

Figure 4:
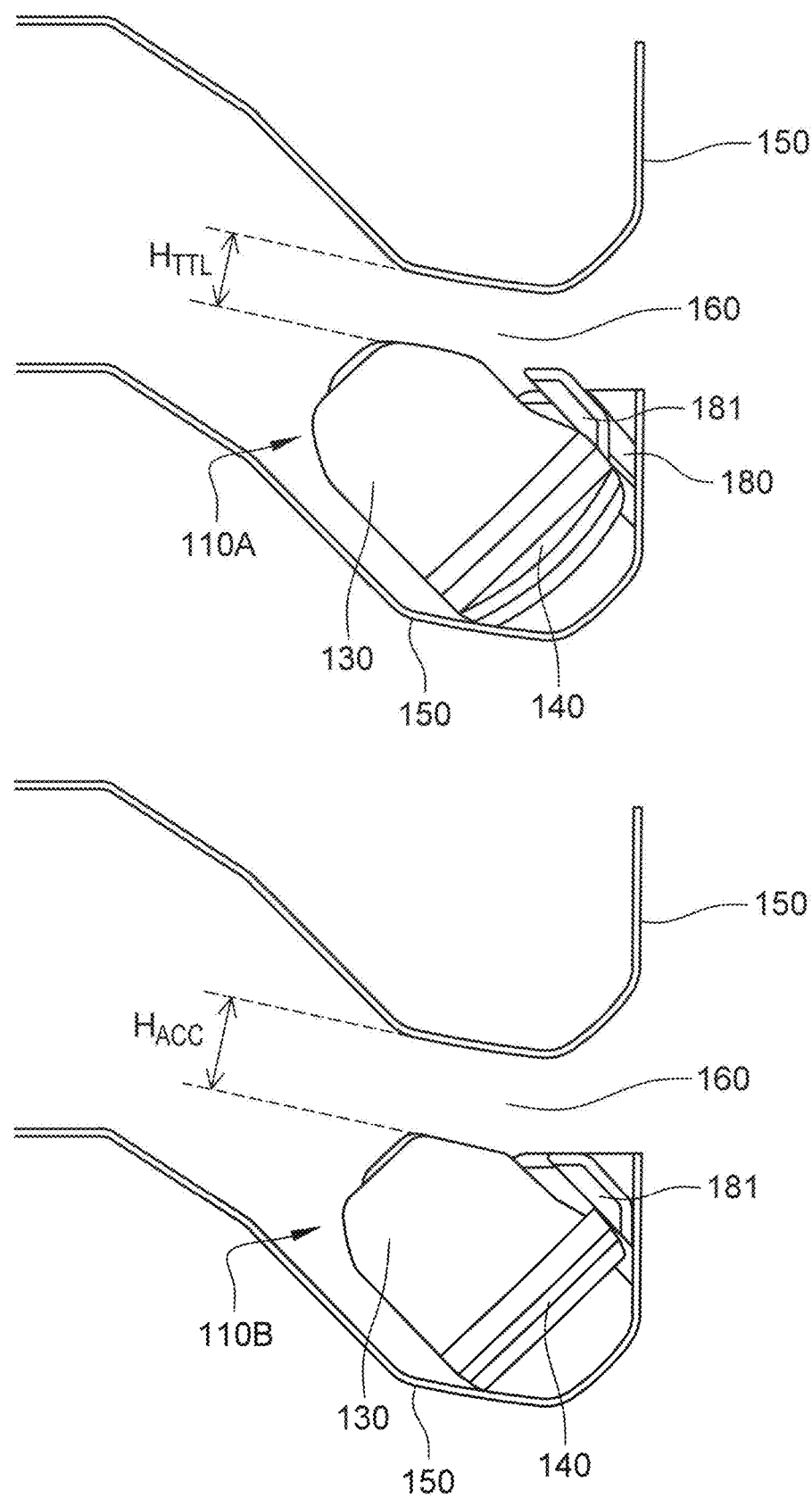
FIG. 4 shows two seat units in side view respectively in a docking position and a TTL position.

During these phases, the seat unit 100 is configured so that the seat 110 adopts a so-called takeoff/taxiing/landing position, abbreviated "TTL". In such a position, the sitting portion 130 is away from the shell 150 and the backrest 140 is reclined in the direction of the shell 150, as shown for the seat 110A in FIGS. 3 and 4.

It is specified that in this position, the spacing separating the sitting portion 130 from the shell 150 is not necessarily a maximum spacing, and should be understood with regards to the docking position described hereinafter. Similarly, the fact that the backrest 140 is reclined in the direction of the shell 150 means that, from the sitting portion 130, the backrest 140 is progressively brought closer to the shell 150 as one approaches the free end of the backrest 140. Nonetheless, the reclination position is not necessarily a maximum reclination.

In such a so-called TTL position, the width of the passage 160 between the sitting portion 130 and the rear face of the shell 150 of a previous similar seat, or of a wall of the aircraft, is a reduced width $H_{TTL}$. In general, the width $H_{TTL}$ is in the range of 6.5 inches, i.e. 152.4 mm, which does not represent enough width for the comfortable passage of a passenger.

Thus, it is provided for the seat unit 100 to be configured so that the seat 110 could also adopt a so-called docking position, abbreviated as "ACC". In such a position, the sitting portion 130 is brought close to the shell 150, and the backrest 140 is substantially parallel to the shell 150, as shown for the seat 110B in FIGS. 3 and 4. By substantially parallel, it should be understood the tolerance of a parallelism defect of more or less 5 degrees between the backrest 140 and the shell 150.

In this position, the closer position of the sitting portion 130 is in general a proximal position of the shell 150, i.e. it is the closest position to the shell 150 that could be reached. In general, the position of the backrest 140 is the position the most reclined as possible. In other words, it is a position in which the backrest 140 is pivoted in the direction of the sitting portion 130 relative to the latter, in comparison with the TTL position.

If the shape of the shell 150 facing the backrest 140 is not substantially planar, or a longitudinal section of the shell 150 is not substantially rectilinear as shown in FIG. 3, then the docking position corresponds to a position in which in particular the backrest 140 is brought as close as possible to the shell 150 by moving the sitting portion 130 backward and straightening the backrest 140, yet without being strictly parallel to the latter.

In the docking position, the width of the passage 160 between the sitting portion 130 and the rear face of the shell 150 of a previous similar seat, or of a wall of the aircraft, is an increased width $H_{ACC}$. In general, the width $H_{ACC}$ is in the range of 9 inches, i.e. about 228.6 mm, which represents a width of the passage 160, or egress, wide enough for a passenger to be able to comfortably get out and in his/her seat 110.

In order for the transition from one position to another to take place without effort from the passenger, a means 170 for detecting a presence of the passenger on the seat 110 is provided.

In particular, the detection means 170 may be a pressure sensor integrated into the sitting portion 130. It may also consist of a presence sensor such as an infrared sensor, arranged on the seat 110 or at the periphery of the latter.

The detection means 170 is connected to a control unit of the seat unit 100 which, according to the data transmitted by the detection means 170, controls the position of the seat 110.

When the detection means 170 detects a presence of the passenger on the seat 110, the control unit transmits the instruction to the seat 110 to adopt the TTL position.

The detection of a presence of a passenger, in the case of a pressure sensor for example, may correspond to exceeding a predetermined pressure threshold, substantially lower than the pressure exerted by a child or an adult of average weight, by the control unit. In this manner, it could be avoided that the seat 110 changes position when an object with a low weight, such as a bag, is set on the sitting portion 130.

The TTL position is a position taken by default, when the passenger sits on the seat 110. Nonetheless, it is not excluded that the passenger could select another position of the seat after sitting, if this is allowed by the control unit, the latter could be configured to block the selection of other positions, in particular during the takeoff or landing phases. To this end, the seat unit 100 may be provided with a human-machine interface such as a control panel. It may also be provided to perform such an adjustment via a multimedia interface arranged in front of the seat 110, on the shell 150 of the previous seat.

When the detection means 170 detects no presence of the passenger on the seat 110, the control unit transmits the instruction to the seat 110 to adopt the docking position.

In other words, when the passenger is not seated on the seat 110, the latter is always in the docking position, so as to clear access thereto.

Thus, it should be understood that the seat unit 100 is configured so as to offer a comfortable position for the passenger when he/she is detected on the seat 110, and to offer a facilitated access to the seat 110 when the passenger is not detected on the seat 110.

In order for the adoption of either one of the TTL or docking positions to be fully automated, each of the sitting portion 130 and the backrest 140 is actuated by a motor-driven mechanism.

The motor-driven mechanism of each of the sitting portion 130 and of the backrest 140 are respectively driven by an electric actuator. The electric actuators are connected to said control unit, which controls them according to the data received by the detection means 170, or the human-machine interface where appropriate.

In particular, as shown in FIG. 3, the mechanism actuating the sitting portion 130 comprises a notched bar and a pinion actuated by an electric motor. The sitting portion 130 is arranged on a rail of the base 120, enabling it to move in translation relative to the latter.

Figure 5:
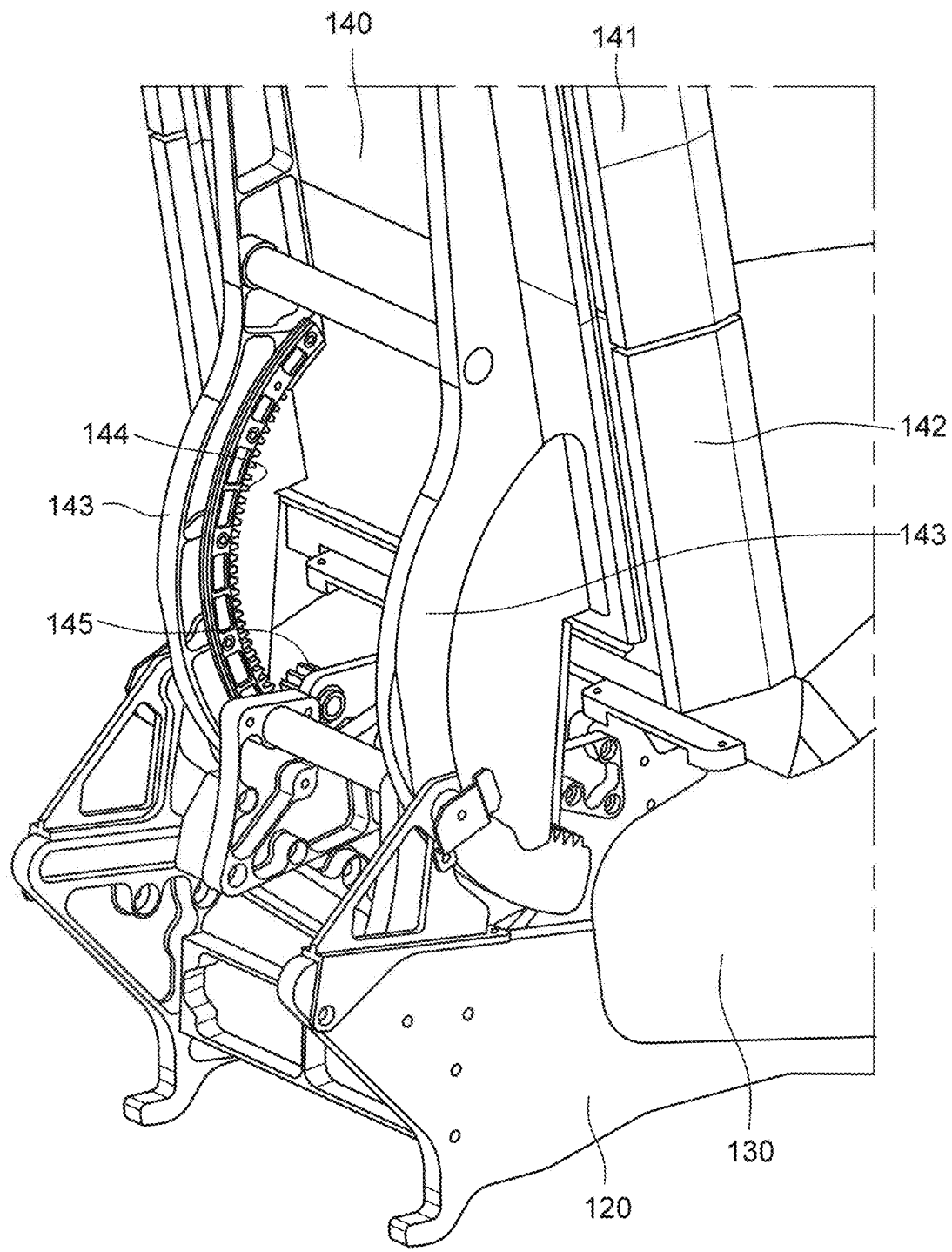
FIG. 5 shows a detailed schematic view of the motor-driven mechanism of the backrest, and of the lumbar support mechanism.

In turn, the backrest 140 is rotatable relative to the sitting portion 130. In particular, as shown in FIG. 5 (in which the seat is in the TTL position), the backrest 140 is supported by a pair of flanges 143 provided with circle arc shaped notched bars 144. Said notched bars 144 run on pinions 145 pivotably fastened on the sitting portion 130. The pinions 145 are actuated by one or more electric motor(s).

Thus, it should be understood that the movement of the backrest 140 relative to the base 120 is a combination of a translation 130 (of the sitting portion relative to the base) with a rotation (of the backrest relative to the sitting portion).

Preferably, the aforementioned mechanisms are sized so that the amplitude of translation of the sitting portion 130 relative to the base 120 is comprised between 500 and 580 mm, preferably 540 mm, and the amplitude of rotation of the backrest 140 relative to the sitting portion 130 is comprised between 92 and 102, preferably 97 degrees. These amplitudes enable switching from the docking position into a bed position (in which the backrest and the sitting portion are located substantially in the same plane), which are extreme positions.

Between the docking and TTL positions, the amplitude of translation of the sitting portion 130 relative to the base 120 is preferably 110 mm, and the amplitude of rotation of the backrest 140 relative to the sitting portion 130 is preferably 12 degrees.

Moreover, in order to improve the comfort of the passenger in the docking position (although it is occupied only for a few seconds), a lumbar support area may be provided.

To this end, the backrest 140 comprises an upper portion 141 and a movable lower portion 142.

In particular, the upper portion 141 is connected to said flanges 143 supporting the backrest 140, and the portion 142 is connected to the upper portion 141 by a hinge. For example, such a hinge may be formed by the external covering of the backrest 140, which is continuous over the two portions.

The lower portion 142 is configured to be inclined in the direction of the upper portion 141, when the seat 110 is in the docking position.

Figure 6:
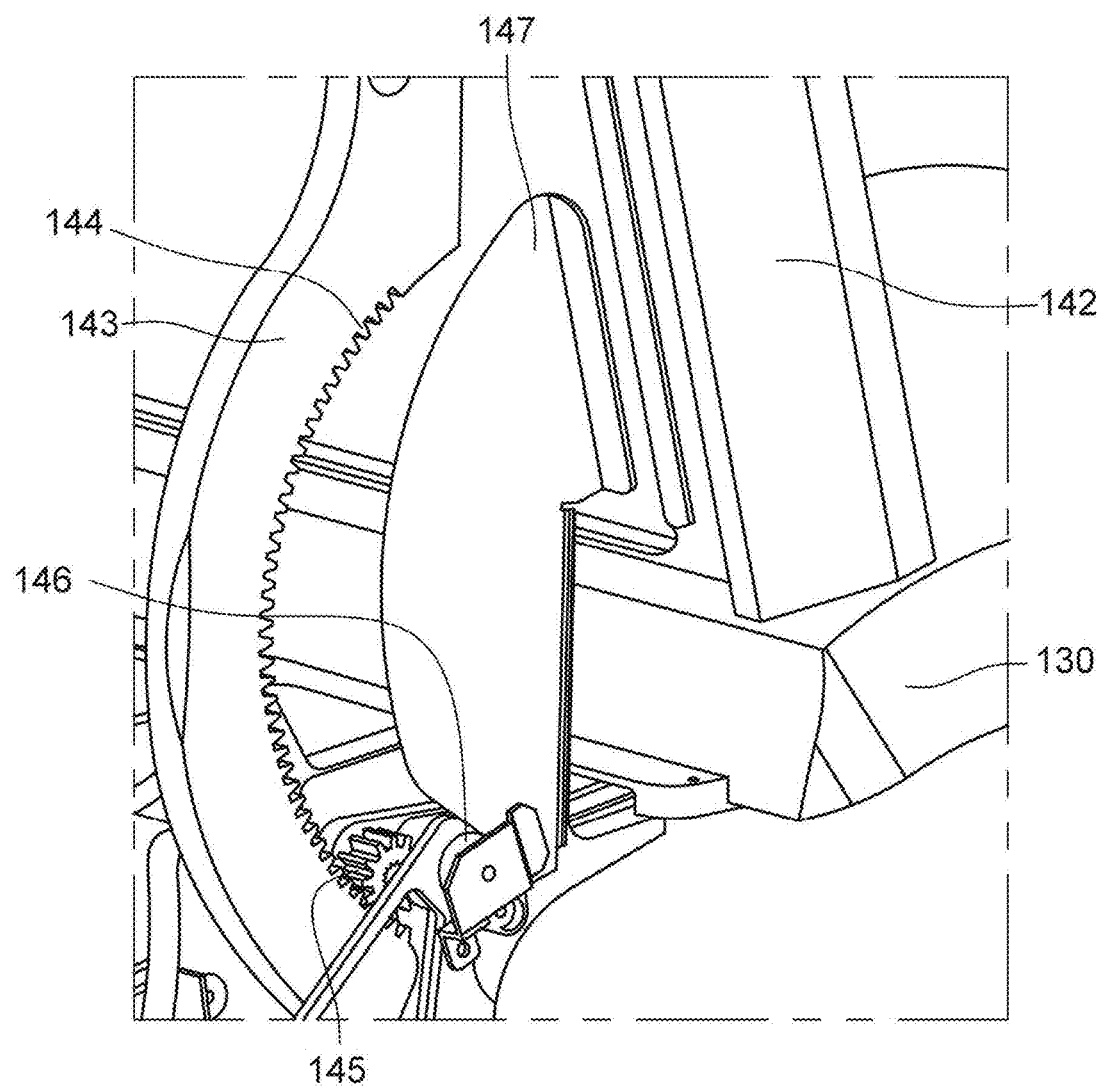
FIG. 6 shows a detailed schematic view of the lumbar support mechanism.

More specifically, in such a situation, the face of the backrest 140 oriented towards the passenger has a "fold" or "break", as shown on the seat 110B of FIG. 3, as well as in FIG. 6 (in which the seat is in the docking position). Preferably, the angle formed between the portions 141 and 142 is an obtuse angle β of about 10 to 20 degrees, preferably 13 to 17 degrees, and even more preferably 15 degrees in the docking position.

Preferably, in the TTL position, the portions 141 and 142 are aligned substantially in the same plane, with no visible break or fold.

Thus, to relieve the passenger, an area for lumbar support of the passenger is formed in said docking position, which is relatively uncomfortable by the way. Nonetheless, this area disappears when the seat 110 is in the TTL position, which is much more comfortable.

In order for the lumbar support to be progressive between the docking and TTL positions, and synchronized with the movements of the sitting portion 130, a particular mechanism is advantageously provided.

A roller 146 pivotably fastened on the sitting portion 130 is provided in contact with a cam 147 secured to the lower portion 142 of the backrest 140. The cam 147 may be in the form of a plate having a contour forming a cam profile which is adapted for the lower portion 142 pivots in the direction of the upper portion 141 of the backrest when the sitting portion 130 is moved in the direction of the shell 150. In particular, to achieve this, the cam profile may be selected so as to form a circle arc with a variable diameter, as shown in FIG. 6.

It should also be understood that, in this manner, no additional actuator is necessary to tilt the lower portion 142.

Moreover, one or more armrest(s) 180 are generally provided in modern seat units 100. In order for the presence of such an armrest 180 not to be troublesome in the passage or egress 160, it is provided that it is retractable in the direction of the shell 150.

In general, the armrest 180 is fixed with respect to the base 120, and comprises a fixed base body and a retractable portion 181. The retractable portion 181 is slidably arranged on the base body. The movement of the retractable portion 181 may be manual, and may comprise, for example, a notching with a plurality of predetermined positions, or be actuated by a motor-driven mechanism.

In the latter case, the motor-driven mechanism is advantageously synchronized with the motor-driven mechanisms of the sitting portion 130 and of the backrest 140, so as to automatically clear the passage 160 when the seat 100 is in the docking position.

What is claimed is:

1. A seat unit for a passenger of an aircraft, the seat unit comprising:
   a seat with an adjustable position and a shell configured to isolate said seat from neighboring seat units, said seat including a sitting portion and a backrest movable on a base, said sitting portion and said backrest being actuated by a respective motor-driven mechanism, wherein the seat unit further comprises a means for detecting a presence of said passenger on the seat, said seat being configured to:

adopt a takeoff/taxiing/landing position when a presence of the passenger is detected by said detection means, in which said sitting portion is positioned a predetermined distance from said shell and in which said backrest is reclined in the direction of said shell, and adopt a docking position when no presence of the passenger is detected by said detection means, in which said sitting portion is positioned at a distance less than the predetermined distance from said shell, and in which said backrest is substantially parallel to said shell, so as to widen a passage formed between said seat and a respective neighboring seat unit arranged in front of said seat, or a wall of the aircraft, when said unit is installed in an aircraft cabin of the aircraft.

2. The seat unit according to claim 1, wherein said backrest comprises an upper portion and a movable lower portion configured to be inclined in the direction of said upper portion in said docking position, so as to form an area for lumbar support of a passenger in said docking position.

3. The seat unit according to claim 2, wherein said lower portion is able to be inclined via a roller pivotably fastened to said sitting portion, and a cam secured to said lower portion of the backrest, said cam having a profile such that said lower portion pivots in the direction of the upper portion of the backrest when the sitting portion is moved towards said shell of said seat unit.

4. The seat unit according to claim 2, wherein said lower portion is secured to said upper portion via a hinge.

5. The seat unit according to claim 1, wherein said detection means is a pressure sensor.

6. The seat unit according to claim 1, wherein the respective motor-driven mechanism of said sitting portion is configured to move said sitting portion in translation relative to said base, and wherein the respective motor-driven mechanism of said backrest is configured to move said backrest in rotation relative to said sitting portion.

7. The seat unit according to claim 6, wherein, between said takeoff/taxiing/landing position and docking position, the amplitude of translation of said sitting portion relative to said base is comprised between 60 and 160 mm, and the amplitude of rotation of said backrest relative to said sitting portion is comprised between 8 and 16 degrees.

8. The seat unit according to claim 1, the seat including a base and said base further comprising an armrest retractable in the direction of said shell, so as to clear said passage formed between said seat and the shell of a seat unit in said docking position.

9. The seat unit according to claim 8, wherein said armrest is actuated by another motor-driven mechanism.

10. A seat arrangement for an aircraft cabin, including at least two seat units, wherein each of the at least two seat units is a seat unit as defined in claim 1 and arranged in front of one another in an alignment direction.

11. The seat arrangement according to claim 10, wherein the at least two seat units are oriented in the alignment direction, corresponding to the direction of a longitudinal axis of an aircraft when the at least two seat units are installed in a cabin of the aircraft.

12. The seat arrangement according to claim 10, wherein the at least two seat units are oriented obliquely with respect to the alignment direction, corresponding to the direction of a longitudinal axis of an aircraft when the at least two seat units are installed in a cabin of the aircraft.

13. An aircraft, comprising a cabin including at least one seat arrangement according to claim 10.

* * * * *